United States Patent
Brochu

(10) Patent No.: US 10,276,189 B1
(45) Date of Patent: Apr. 30, 2019

(54) DIGITAL AUDIO TRACK SUGGESTIONS FOR MOODS IDENTIFIED USING ANALYSIS OF OBJECTS IN IMAGES FROM VIDEO CONTENT

(71) Applicant: SHUTTERSTOCK, INC., New York, NY (US)

(72) Inventor: Nicholas Brochu, Montreal (CA)

(73) Assignee: SHUTTERSTOCK, INC., New York, NY (US)

( * ) Notice: Subject to any disclaimer, the term of this patent is extended or adjusted under 35 U.S.C. 154(b) by 113 days.

(21) Appl. No.: 15/392,705

(22) Filed: Dec. 28, 2016

(51) Int. Cl.
| | |
|---|---|
| *G06K 9/00* | (2006.01) |
| *G10L 25/63* | (2013.01) |
| *G06K 9/66* | (2006.01) |
| *G06F 17/27* | (2006.01) |
| *G10L 25/30* | (2013.01) |
| *G10L 25/57* | (2013.01) |

(52) U.S. Cl.
CPC .......... *G10L 25/63* (2013.01); *G06F 17/2785* (2013.01); *G06K 9/00711* (2013.01); *G06K 9/00765* (2013.01); *G06K 9/66* (2013.01); *G10L 25/30* (2013.01); *G10L 25/57* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0160944 A1* | 8/2003 | Foote | .................. | G03B 31/00 352/1 |
| 2004/0085341 A1* | 5/2004 | Hua | .................. | G11B 27/034 715/723 |
| 2005/0259866 A1* | 11/2005 | Jacobs | .................. | G06K 9/00463 382/157 |
| 2010/0211966 A1* | 8/2010 | Zhang | .................. | H04H 60/33 725/10 |
| 2011/0184539 A1* | 7/2011 | Agevik | .................. | G11B 20/24 700/94 |

\* cited by examiner

*Primary Examiner* — Alex Kok S Liew
(74) *Attorney, Agent, or Firm* — McDermott Will & Emery LLP

(57) ABSTRACT

Methods for suggesting an audio file for playback with a video file using an analysis of objects in images from the video file are provided. In one aspect, a method includes receiving a selection of a video file, identifying shot transition timings in the video file, and analyzing each shot transition associated with the identified shot transition to a identify an entity within the respective shot transition. The method also includes providing an identification of the identified entities to a natural language model to identify at least one mood associated with the identified entities, selecting, from a collection of audio files, at least one audio file associated with the at least one mood and including an average audio onset distance within an audio onset distance threshold, and providing an identification of the at least one audio file as a suggestion for audio playback with the video file. Systems and machine-readable media are also provided.

20 Claims, 13 Drawing Sheets

| Word | Earliest Seen Layer |
|---|---|
| Adventure | ∅ |
| Excursion | 1 |
| Thrills | 1 |
| Odyssey | 1 |
| Trip | 2 |
| Trek | 2 |
| Voyage | 2 |
| Visit | 3 |
| Roadtrip | 3 |
| Traveling | 3 |
| [· · ·] | [· · ·] |

{words: [(rollercoaster, 3),(crowd, 5),(palm tree, 2),(mascot, 1)]}

| Word | Earliest Seen Layer |
|---|---|
| Roller Coaster | ∅ |
| Palm Tree | ∅ |
| Thrill Ride | 1 |
| Tropical | 1 |
| Thrills | 2 |
| Adventure | 2 |
| Rainforest | 2 |
| Ecotourism | 3 |
| Traveling | 4 |
| [ . . . ] | [ . . . ] |

541 → Mood Maximum Layer = 10
542 → Input Maximum Layer = 5
Mood = Adventure

| Words in Common: Mood and Input | Score Calculation |
|---|---|
| Adventure | (10-0) + (5-2)=13 |
| Thrills | (10-1) + (5-2)=12 |
| Traveling | (10-3) + (5-4)=8 |

543 / 544 / 545 / 540

Total Score with Mood and Input: 33

FIG. 5F

701 → Video Shot Transition Timings: [1,3,5,7,9,11,13,15,17,19,21,23,25]
702 → Song A Onset Timings: [1,2,3,36,38,48,52,54]
703 → Song B Onset Timings: [1,7,22,24,37,52,57,74]

FIG. 7A

704 → Song A: (1,2,3,36) (2,3,36,38) (3,36,38,48) (36,38,48,52) (38,48,52,54) ←706

705 → Song B: (1,7,22,24) (7,22,24,37) (22,24,37,52) (24,37,52,57) (37,52,57,74)
      708

FIG. 7B

Song A: (0,1,2,35) (0,1,34,36) (0,33,35,45) (0,2,12,16) (0,10,14,16) ←707

Song B: (0,6,21,23) (0,15,17,30) (0,2,15,30) (0,13,28,33) (0,15,20,37)
      709

FIG. 7C

Video: (1,3,5,7) (3,5,7,9) (1,7,15,25) (3,5,15,19) (7,9,21,25)

FIG. 7D

Video: (0,2,4,6) (0,2,4,6) (0,6,14,29) (0,2,12,16) (0,2,14,18)

FIG. 7E

Song A:

| Video / Audio | (0,2,4,6) | (0,6,14,24) | (0,2,12,16) | [• • •] |
|---|---|---|---|---|
| (0,1,34,36) | 7.625 | 4.625 | 5.375 | |
| (0,2,12,16) | 2.25 | 1.75 | ⓪ | |
| (0,10,14,16) | 3.25 | 1.5 | 0.75 | |
| [• • •] | | | | |

Result: (0,2,12,16)
↓
(㊱,38,48,52)
Distance: 0.0    Offset: 36

Song B:

| Video / Audio | (0,2,4,6) | (0,6,14,24) | (0,2,12,16) | [• • •] |
|---|---|---|---|---|
| (0,6,21,23) | 4.5 | ① | 2.5 | |
| (0,2,15,30) | 4.375 | 1.375 | 2.125 | |
| (0,13,28,33) | 7.5 | 2.5 | 4 | |
| [• • •] | | | | |

Result: (0,6,21,23)
↓
(①,7,22,24)
Distance: 1.0    Offset: 1

Song A: (0.0,36)
Song B: (1.0,1)

FIG. 7F

|       | 754 | | 752 |
|-------|-----|---|-----|
| Song A: Video / Audio | (0,2,12,16,18) | (0,2,12,16,20) | (0,2,12,18,22) |
| (0,2,12,16,18) | ∅ | 0.2 | 0.4 |

755

Song B: No Expansion was Possible; End of Sequence Reached

{ song - matches: [(song A,5,0.0,36)(song B,4,1.0,1)]}

Window Size = 4    On → Video Shot Transition Sequence

| Fast | Precise (Max: 10) |
|------|-------------------|
| (1,3,5,7) | (7,11,17,19) |
| (3,5,7,9) | (9,13,15,23) |
| (5,7,9,11) | (3,5,15,19) |
| (7,9,11,13) | (19,21,23,25) |
| (9,11,13,15) | (1,7,13,15) |
| [· · ·] | (21,23,25) Invalid → Next |
|  | (3,11,15,17) |
|  | (5,9,11,15) |
|  | (11,15,17,21) |
|  | (7,13,19,25) |
|  | (15,19,23,25) |

DIGITAL AUDIO TRACK SUGGESTIONS FOR MOODS IDENTIFIED USING ANALYSIS OF OBJECTS IN IMAGES FROM VIDEO CONTENT

TECHNICAL FIELD

The present disclosure generally relates to identification of relationships between media content using data algorithms for processing media content.

BACKGROUND

A person interested in purchasing digital media content such as an image, video, or audio can commonly browse the World Wide Web for online digital media content repositories from which to purchase digital media content for use, whether personal or professional. Many such online media content repositories have more than one type of digital media for sale. It is often difficult, however, for such a person (or "user") seeking to purchase two types of media content to use together to find media content that relates to one another (e.g., video content that will display well with audio content), often due to inaccurate or missing data tagging (e.g., metadata tags). Similarly, it is commonly difficult for the online media content repository system to suggest from a large repository a second type of media content that will be suitable for use with a first type of media content selected by a user.

The description provided in the background section should not be assumed to be prior art merely because it is mentioned in or associated with the background section. The background section may include information that describes one or more aspects of the subject technology.

SUMMARY

The disclosed system provides for the identification of aspects of both video content and audio content, such as timings, that facilitate the recommendation of audio content for playback with video content according to a mood or other factor identified as common to both.

According to certain aspects of the present disclosure, a computer-implemented method is provided. The method includes receiving a selection of a video file, identifying shot transition timings in the video file, and analyzing each shot transition associated with the identified shot transition timings to a identify an entity within the respective shot transition. The method also includes providing an identification of the identified entities to a natural language model to identify at least one mood associated with the identified entities, selecting, from a collection of audio files, at least one audio file associated with the at least one mood and including an average audio onset distance within an audio onset distance threshold, and providing an identification of the at least one audio file as a suggestion for audio playback with the video file.

According to certain aspects of the present disclosure, a system is provided. The system includes a memory including a collection of audio files associated with a plurality of moods, and a processor. The processor is configured to execute instructions which, when executed, cause the processor to receive a selection of a video file, identify shot transition timings in the video file, and analyze each shot transition associated with the identified shot transition timings to a identify an entity within the respective shot transition. The processor is also configured to execute instructions which, when executed, cause the processor to provide an identification of the identified entities to a natural language model to identify at least one mood, from the plurality of moods, associated with the identified entities, select, from a collection of audio files, at least one audio file associated with the at least one mood and including an average audio onset distance within an audio onset distance threshold, and provide an identification of the at least one audio file as a suggestion for audio playback with the video file.

According to certain aspects of the present disclosure, a non-transitory machine-readable storage medium including machine-readable instructions for causing a processor to execute a method is provided. The method includes receiving a selection of a video file, identifying shot transition timings in the video file, and analyzing each shot transition associated with the identified shot transition timings to a identify an entity within the respective shot transition. The method also includes providing an identification of the identified entities to a natural language model to identify at least one mood associated with the identified entities, selecting, from a collection of audio files, at least one audio file associated with the at least one mood and including an average audio onset distance within an audio onset distance threshold, and providing an identification of the at least one audio file as a suggestion for audio playback with the video file.

According to certain aspects of the present disclosure, a system is provided. The system includes means for receiving a selection of a video file. The system also includes means for identifying shot transition timings in the video file, the means for identifying also configured for analyzing each shot transition associated with the identified shot transition timings to a identify an entity within the respective shot transition, providing an identification of the identified entities to a natural language model to identify at least one mood associated with the identified entities, and selecting, from a collection of audio files, at least one audio file associated with the at least one mood and including an average audio onset distance within an audio onset distance threshold. The means for receiving is also configured for providing an identification of the at least one audio file as a suggestion for audio playback with the video file.

According to certain aspects of the present disclosure, a computer-implemented method is provided. The method includes providing a selection of a video file, receiving an identification of at least one mood identified by a natural language model processing names of entities identified from each shot transition in the video file. The method also includes receiving an identification of at least one audio file, from a collection of audio files, associated with the at least one mood and including an average audio onset distance within an audio onset distance threshold, and selecting the at least one audio file for audio playback with the video file.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 5A-5F are example illustrations of data from an example video file associated with the example process of FIG. 4.

FIGS. 7A-7J are example illustrations of data from an example video file associated with the example process of FIG. 6.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for the analysis of a digital video file to identify, from detected shot transitions (e.g., frames) of the video file, entities in the video file that are indicative of a mood associated with the video file. Digital audio files associated with the same or similar mood are then processed to identify audio files having a sufficiently similar enough audio onset distance to at least some of the shot transitions of the video file, and audio files (or portions thereof) having such sufficiently similar audio onset distances are suggested for audio playback with the video file.

The disclosed system provides an improvement to computer functionality by allowing computer performance of a function not previously performed by a computer. Specifically, the disclosed system allows for the performance by a computer of the function of providing an identification of identified entities within shot transitions of a video file to a natural language model to identify at least one mood associated with the identified entities, selecting, from a collection of audio files, at least one audio file associated with the mood and including an average audio onset distance within an audio onset distance threshold, and providing an identification of the audio file as a suggestion for audio playback with the video file.

Example System Architecture

Figure 1:
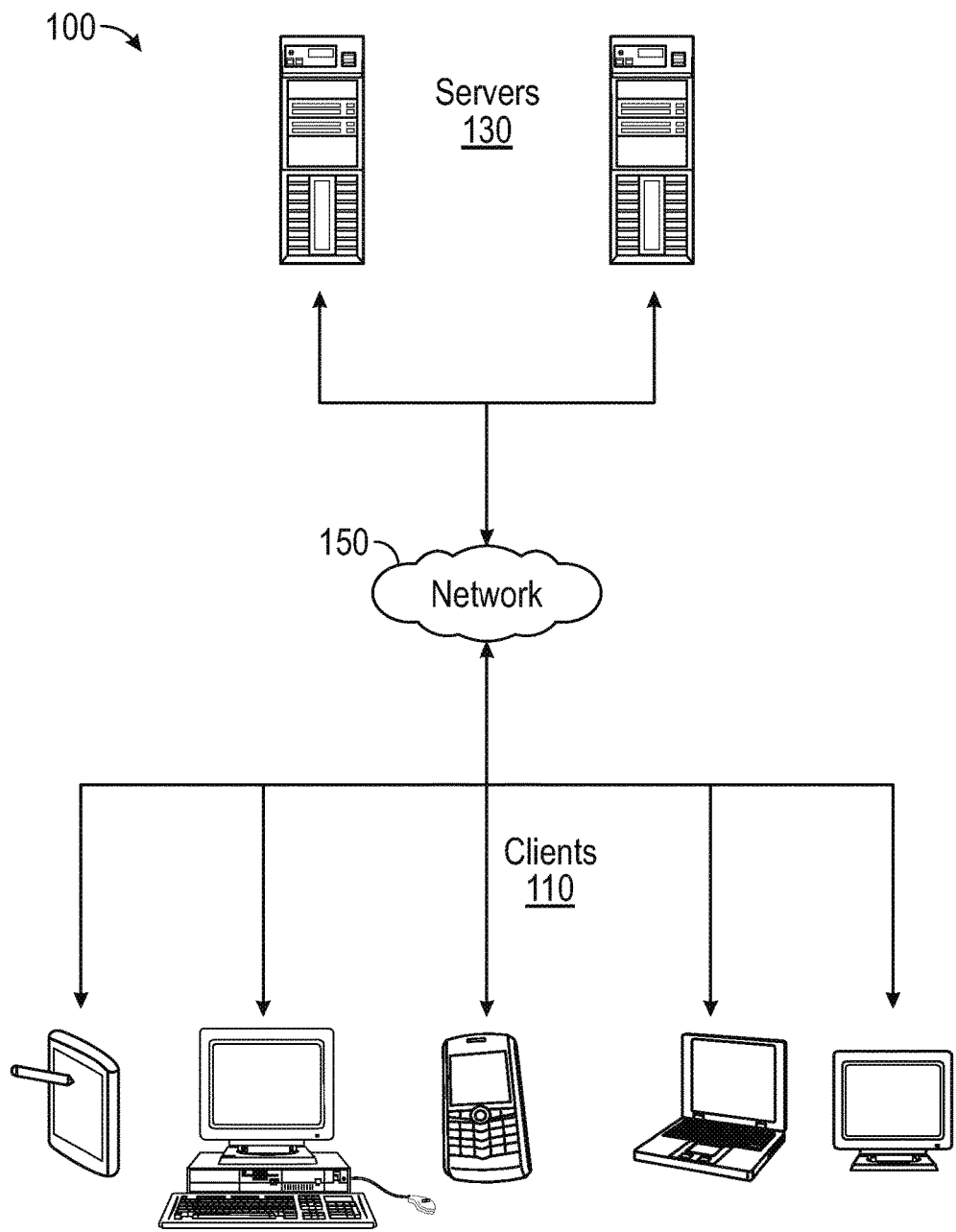
FIG. 1 illustrates an example architecture for suggesting an audio file for playback with a video file using an analysis of objects in images from the video file.

FIG. 1 illustrates an example architecture 100 for suggesting an audio file for playback with a video file using an analysis of objects in images from the video file. The architecture 100 includes servers 130 and clients 110 connected over a network 150.

One of the many servers 130 is configured to host a collection of audio files, as well as a convolutional neural network, natural language model, media processing engine, and mood suggestion engine. For purposes of load balancing, multiple servers 130 can host any or each of these items. The servers 130 can be any device having an appropriate processor, memory, and communications capability for hosting the collection of audio files, convolutional neural network, natural language model, media processing engine, and mood suggestion engine. In certain aspects, one or more of the servers 130 can be a cloud computing server of an infrastructure-as-a-service (IaaS) and be able to support a platform-as-a-service (PaaS) and software-as-a-service (SaaS) services.

A user of one or many of the clients 110 can provide a copy of a video file to one of the servers 130 over the network 150. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The server 130 that receives the video file is configured to provide the video file to the media processing engine (on the same or different server 130) to identify shot transitions timings within the video file, and provide copies of the shot transitions and their timings back to the media processing engine. The media processing engine then provides copies of the identified shot transitions to the convolutional neural network (on the same or different server 130), which is configured to analyze each of the shot transitions to identify entities from the shot transitions, and provide an identification of the entities from the shot transitions back to the media processing engine.

The media processing engine then provides the identification of the entities to the natural language model (on the same or different server 130), which analyzes the entities as words and provides one or many moods associated with the words representing the entities back to the media processing engine. The media processing engine thereafter provides an identification of the mood and timings for the identified shot transitions from the video file to the mood suggestion engine (on the same or different server 130), which with reference to the collection of audio files identifies to the media processing engine at least one audio file associated with the identified mood that includes an average audio onset distance within an audio onset distance threshold relative to one or many of the timings of the identified shot transitions from the video file. The media processing engine then provides, over the network 150, and to the client 110 that provided the copy of the video file, an identification of the audio file as a suggestion for audio playback with the video file.

Example System for Audio File Playback Suggestion Using Received Video File

Figure 2:
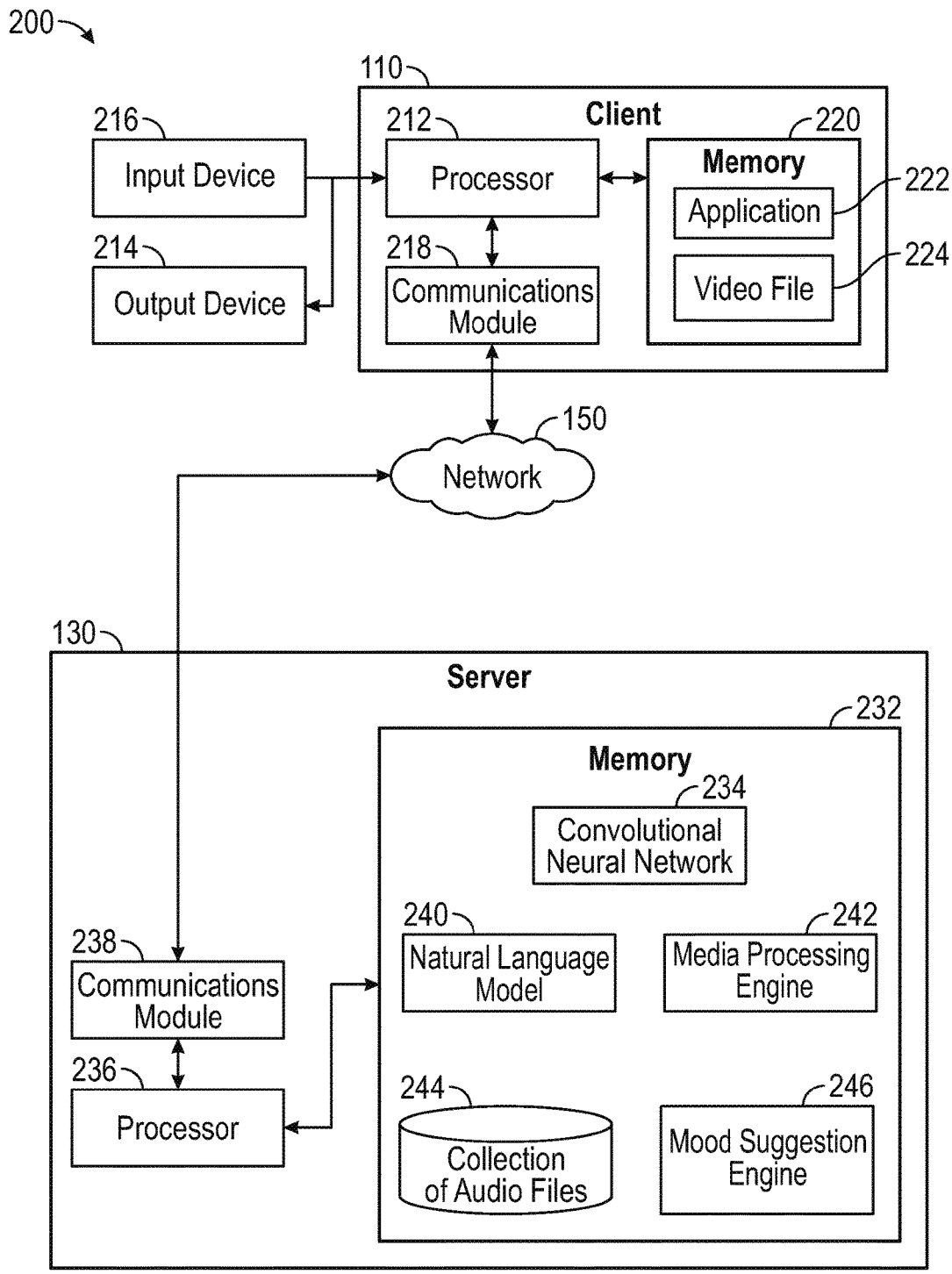
FIG. 2 is a block diagram illustrating the example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure.

The client 110 includes a processor 212, the communications module 218, and a memory 220 that includes a video file 224 and an application 222, such as a web browser or mobile app. The client 110 also includes an input device 216, such as a keyboard, mouse, and/or touchscreen, and an output device 214, such as a display. The processor 212 of the client 110 is configured to execute instructions, such as instructions physically coded into the processor 212, instructions received from software in memory 220, or a combination of both. For example, the processor 212 of the client 110 executes instructions from the application 222 to receive a request to provide an identification of at least one audio file as a suggestion for audio playback with the video file 224, and in response provides information on the video file 224 (e.g., a copy of the video file 224 or a pointer to the video file 224) to the server 130 over the network 150 via the communications modules 218 and 238 of the client 110 and server 130, respectively. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes the collection of audio files 244, the convolutional neural network 234, the natural language model 240, the media processing engine 242, and the mood suggestion engine 246.

As discussed herein, the collection of audio files 244 includes files such as, but not limited to, digital music files with and without vocals, audio lectures, and audio books. The bit layout of the audio portion of the audio files, or "audio coding format", can be uncompressed, or compressed using, for example, lossless or lossy compression. The audio portion can be a raw bitstream in an audio coding format, or can be embedded in a container format or an audio data format with defined storage layer. The audio files can be in various formats including, but not limited to, .3GP, .AA, .AAC, .AAX, .ACT, .AIFF, .AMR, .APE, .AU, .AWB, .DCT, .DSS, .DVF, .FLAC, .GSM, .IKLAX, .IVS, .M4A, .M4B, .M4P, .MMF, .MP3, .MSV, .OGG, .OGA, .MOGG, .OPUS, .RA, .RM, .RAW, .SLN, .TTA, .VOX, .WAV, .WMA, .WV, or .WEBM.

Each of the audio files can be associated with metadata indicating, for example, an album, album sort order, album/movie/show title, artist, attached picture, audio encryption, audio seek point index, band/orchestra/accompaniment, beats per minute (BPM), comments, commercial frame, commercial information, composer, conductor/performer refinement, content group description, content type, copyright message, copyright/legal information, date, encoded by, encoding time, encryption method registration, end-time, equalization, event timing codes, file owner/licensee, file type, general encapsulated object, genre, group identification registration, header, initial key, international standard recording code (ISRC), internet radio station name, internet radio station owner, interpreted, remixed, or otherwise modified by, involved people list, language(s), lead performer(s)/soloist(s), length, linked information, lyricist/text writer, media type, mood, MPEG location lookup table, music CD identifier, musician credits list, official artist/performer webpage, official audio file webpage, official audio source webpage, official internet radio station homepage, original album/movie/show title, original artist(s)/performer(s), original filename, original lyricist(s)/text writer(s), original release year, ownership frame, part of a set payment, performer sort order, play counter, playlist delay, popularimeter, position synchronization frame, private frame, produced notice, publisher, publishers official webpage, recommended buffer size, recording dates, recording time, relative volume adjustment, release time, reverb, seek frame, set subtitle, signature frame, size, software/hardware and settings used for encoding, speed, start-time, subtitle/description refinement, synchronized lyric/text, synchronized tempo codes, tagging time, terms of use, time, title, title sort order, title/song name/content description, track number/position in set, track, unique file identifier, unsynchronized lyric/text transcription, user defined text information frame, user defined URL link frame, year, or zero-byte.

The convolutional neural network 234 of the server 130 is configured to receive images (e.g., frames of shot transitions from the media processing engine 242) and identify objects in the images. The convolutional neural network 234 can be a type of feed-forward artificial neural network where individual neurons are tiled in such a way that the individual neurons respond to overlapping regions in a visual field. The architecture of the convolutional neural network 234 may be in the style of existing well-known image classification architectures such as AlexNet, GoogLeNet, or Visual Geometry Group models. In certain aspects, the convolutional neural network 234 consists of a stack of convolutional layers followed by several fully connected layers. The convolutional neural network 234 can include a loss layer (e.g., softmax or hinge loss layer) to back propagate errors so that the convolutional neural network learns and adjusts its weights to better fit provided image data.

The natural language model 240 of the server 130 is configured to receive a word or group of words and identify from the words a mood associated with the words. The natural language model 240 can be, for example, a Word Embedding model, GloVe model, or Word2Vec model. In certain aspects, the natural language model 240 is trained using at least one of a large text corpus or a lyrics dataset to identify a mood associated with a word or group of words. In certain aspects, the training process creates vectorial representations of words and exposes a way to calculate cosine similarity to other in-context words in the corpus. This can create an effective semantic field for a given word. For example, when asking for semantically similar items for "frog", words or "tokens" such as "reptile", "toad", "pond" may be provided as a part of the response from the natural language model 240.

Exemplary training corpuses of words can include, for example, Common Crawl (e.g., 840B tokens, 2.2M vocabulary terms). The natural language model 240 can be improved by augmenting the training corpus with more relevant texts, such as the content of a lyrics dataset, which may improve the natural language model 240 because song lyrics can commonly be closer to emotions and moods than general purpose text.

Subsequent to training the natural language model 240, a recurring semantic field is generated for each of the moods identified by the natural language model 240. Generating the recurring semantic field can include identifying, for each of the moods, a distance for words (e.g., from a mood) from the large text corpus or the lyrics dataset associated with the respective mood. The recurring semantic field can be built for each potential mood and each potential audio file in the collection of audio files 244. This may be done, for example, by extracting words with the best cosine distances for every word associated with the mood according to the natural language model 240, and then using recursion to apply the same process to every word in the results for n repetitions. This may provide large layers of vocabulary that can have their representation simplified using the following notation: word: earliest seen layer. This representation can be computed and saved for each possible mood.

The mood suggestion engine 246 of the server 130 is configured to receive an identified mood and either audio onset timings for an audio file, or shot transition timings for a video file. When the mood suggestion engine 246 receives audio onset timings for an audio file, then the mood suggestion engine 246 is configured to provide an identification of a video file (e.g., identified from a collection of media files (not illustrated)) that has shot transition timings that on average are within an average distance threshold of the audio onset timings of the received audio file. Similarly, when the mood suggestion engine 246 receives timings for shot transitions in a video file, then the mood suggestion engine 246 is configured to provide an identification of an audio file (e.g., from the collection of audio files 244) that has audio onset distances that are on average within an audio onset distance threshold.

The processor 236 of the server 130 is configured to execute instructions, such as instructions physically coded into the processor 236, instructions received from software in memory 232, or a combination of both. For example, the processor 236 of the server 130 executes instructions from the media processing engine 242 to receive a selection of a video file 224 (e.g., from a user of the client 110), and identify shot transitions timings in the video file 224. The video file 224, a copy of which can be uploaded to the server 130 from the client 110 over the network 150, is analyzed to detect shot transitions timings using shot transition detection video processing techniques that can be abrupt or gradual using, for example, a two-phase-principle such as scoring each pair of consecutive frames in the video file 224 based on the similarity of the two consecutive frames, and deciding that two consecutive frames are indicative of a shot transition if the score is sufficiently high. Scoring can be calculated using techniques such as sum of absolute differences, histogram differences, or edge change ratios. The decision can be made using a fixed threshold, adaptive threshold, or machine learning.

The processor 236 is configured to analyze each shot transition to identify (e.g., with reference to the convolutional neural network 234) an entity within the respective shot transition. For example, in certain aspects, each shot transition is analyzed by submitting each shot transition to the convolutional neural network 234, which is configured to analyze image pixel data for each of the shot transitions to identify entities within the shot transitions. In certain aspects, entities identified in multiple shot transitions can be provided greater weight than entities that are not identified in multiple shot transitions, such as heavier weighted entities can be identified more prominently (or not excluded as opposed to lighter weighted entities) in the listing of entities provided to the natural language model 240. In certain aspects, a shot transition that has no identifiable entity can be discarded (e.g., not used for further processing, such as by the natural language model 240).

The processor 236 is also configured to provide an identification of the identified entities (e.g., from the shot transitions of the video file 224) to the natural language model 240 to identify at least one mood associated with the identified entities. For example, the entities "roller coaster", "ferris wheel", and "amusement park" can each be associated to varying degrees with the mood "adventure". Providing the identification of the identified entities to the natural language model 240 can include, for example, determining a distance of each of the identified entities from each mood to determine a relevance score of each mood to the video file 224, and selecting as a mood most relevant to the video file 224 the mood having the highest relevance score.

The processor 236 is further configured to select, from the collection of audio files 244, at least one audio file associated with the mood associated with the identified entities from the shot transitions of the video file 224 that has an average audio onset distance within an audio onset distance threshold. This can include, for example, determining the timings of the shot transitions in the video file 224, identifying the timings of the detected audio onsets in each audio file from the collection of audio files 244, and applying a time series alignment algorithm to at least a portion of each audio file from the collection of audio files 244 and at least a portion of the video file 224 to determine the average audio onset distance for each audio file with respect to the video file 224.

The processor 236 is also configured to provide an identification of the at least one audio file as a suggestion for audio playback with the video file 224. For example, the processor 236 of the server 130 can provide a document or web page to the application 222 on the client 110 over the network 150 that identifies the audio file as a suggestion to playback with the video file 224.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
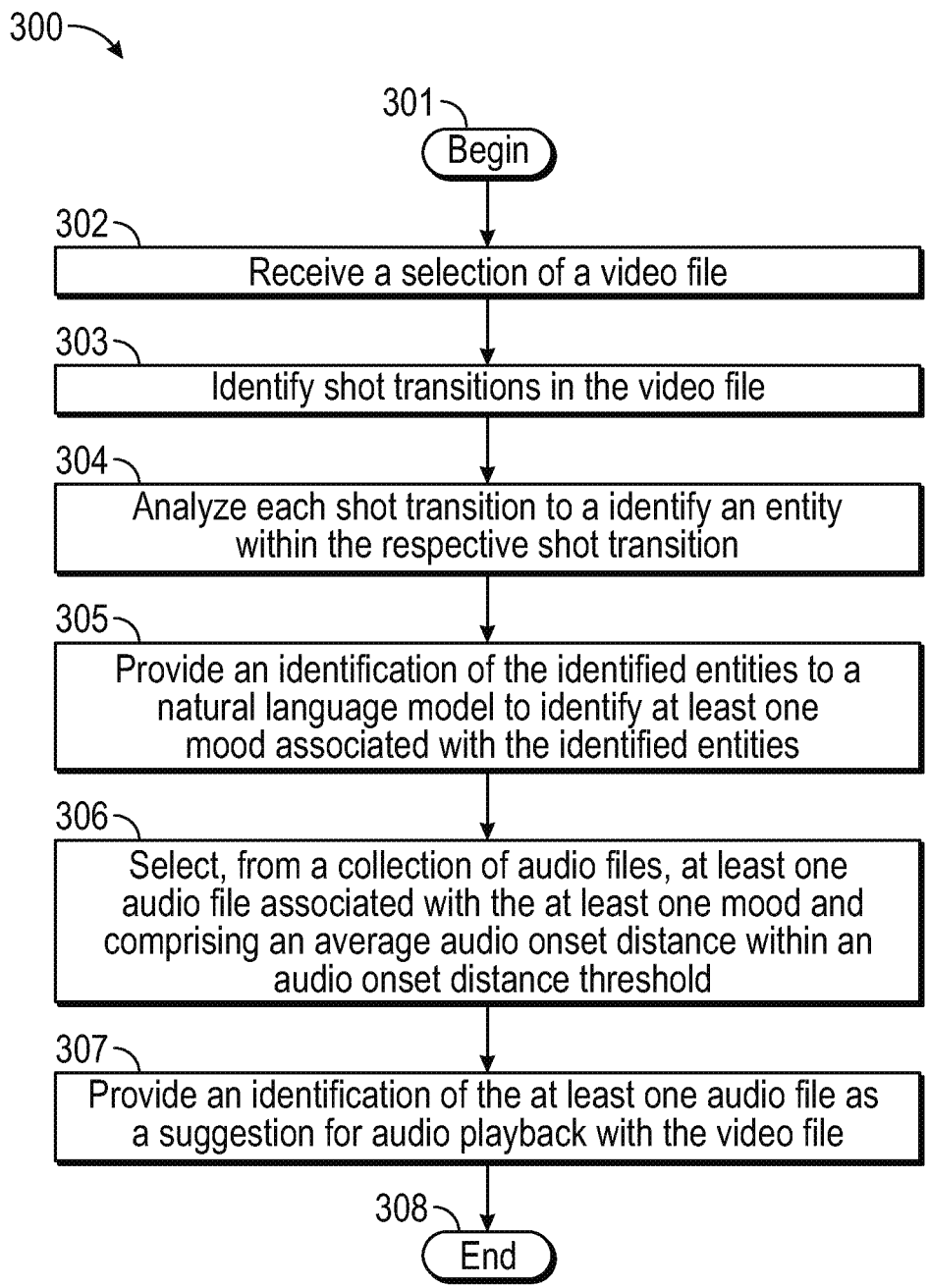
FIG. 3 illustrates an example process for suggesting an audio file for playback with a video file using an analysis of objects in images from the video file using the example server of FIG. 2.

FIG. 3 illustrates an example process 300 for suggesting an audio file for playback with a video file using an analysis of objects in images from the video file using the example server 130 of FIG. 2. While FIG. 3 is described with reference to FIG. 2, it should be noted that the process steps of FIG. 3 may be performed by other systems.

The process 300 proceeds from beginning step 301 to step 302 when a selection of a video file 224 is received (e.g., from a user using an application 222 on a client 110 connected to the server 130). Next, in step 303, shot transitions and their timings in the video file 224 are identified (e.g., by the media processing engine 242), followed by an analysis of each shot transition to identify an entity within the respective shot transition in step 304 (e.g., performed by the convolutional neural network 234). Subsequently, in step 305, an identification of the identified entities is provided (e.g., by the media processing engine 242) to a natural language model 240 to identify at least one mood associated with the identified entities, after which at least one audio file associated with the at least one mood and comprising an average audio onset distance within an audio onset distance threshold is selected from a collection of audio files 244 on the server 130. Finally, in step 307, an identification of the audio file is provided (e.g., to the application 222 on the client 110) as a suggestion for audio playback with the video file 224. The process 300 then ends in step 308.

Figure 4:
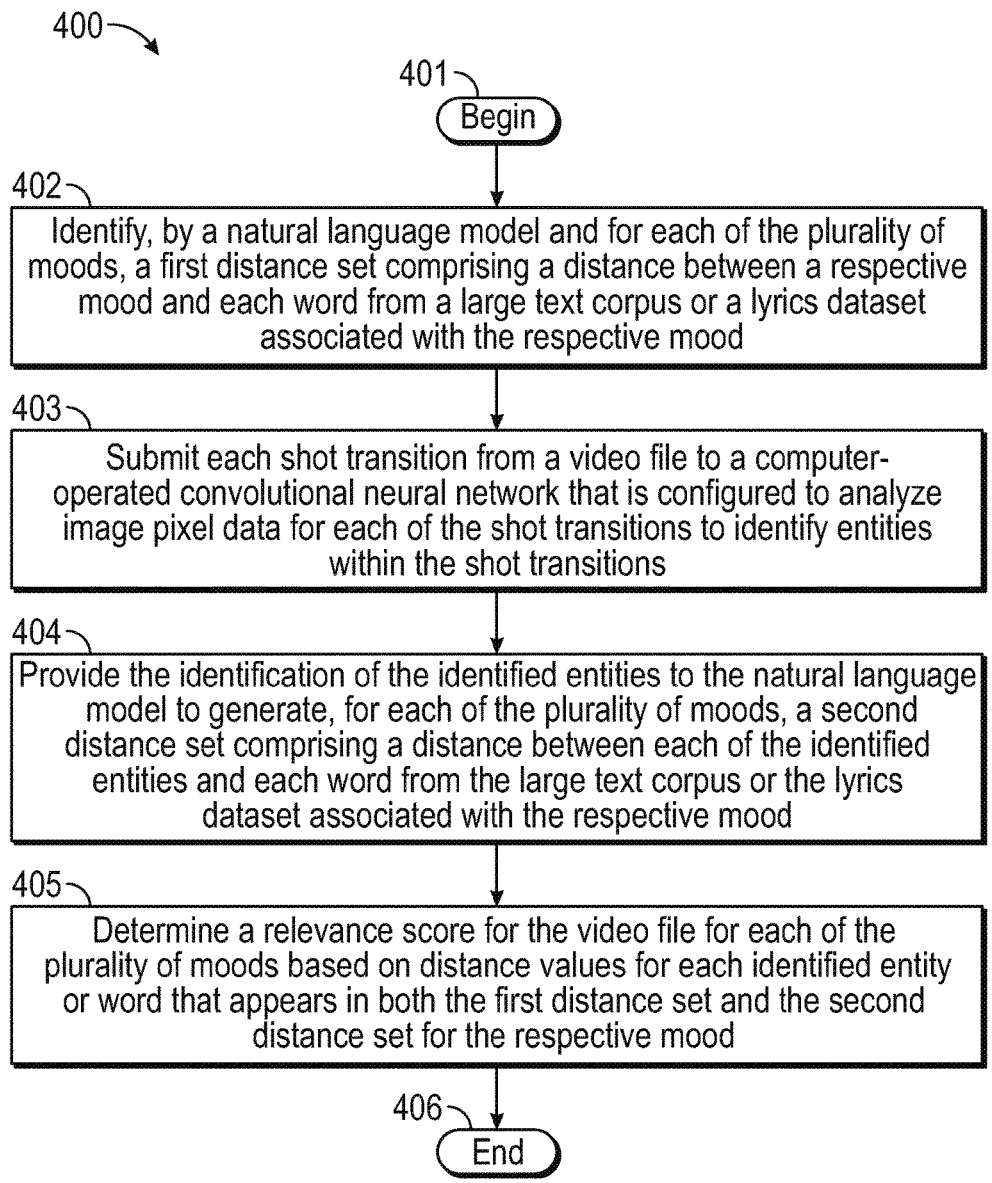
FIG. 4 illustrates an example process for suggesting a mood to associate with a video file.

FIG. 4 illustrates an example process 400 for suggesting a mood to associate with a video file using the example server 130 of FIG. 2. The example process 400 of FIG. 4 closely relates to steps 303-305 of the process 300 of FIG. 3. While FIG. 4 is described with reference to FIG. 2 and FIG. 3, it should be noted that the process steps of FIG. 4 may be performed by other systems and with other methods.

The process 400 proceeds from beginning step 401 to step 402 in which a first distance set, which includes a distance between a respective mood and each word from a large text corpus or a lyrics dataset, is identified for each of a plurality of moods by the natural language model 240. For example, with reference to example illustration 500 of FIG. 5A, which illustrates a recursive semantic field from a mood, the words "excursion", "thrills", and "odyssey" 503 from Layer 1 504 are one layer away from the particular mood "Adventure" 501 identified at Layer 0 502. The words "Trip", "Trek", and "Voyage" are in Layer 2 506 and one layer away from the word "Excursion" of Layer 1 504. The words "Visit", "Roadtrip", and "Traveling" are in Layer 3 508 and one layer away from the word "Trip" of Layer 2 506. This layering continues for the entire set of words used for training the natural language model 240. A table 511 of the words from FIG. 5A and respective layers in which they appear is provided in the example illustration 510 of FIG. 5B, which represents a table of recursive semantic fields.

Figures 5A, 5B, 5C:
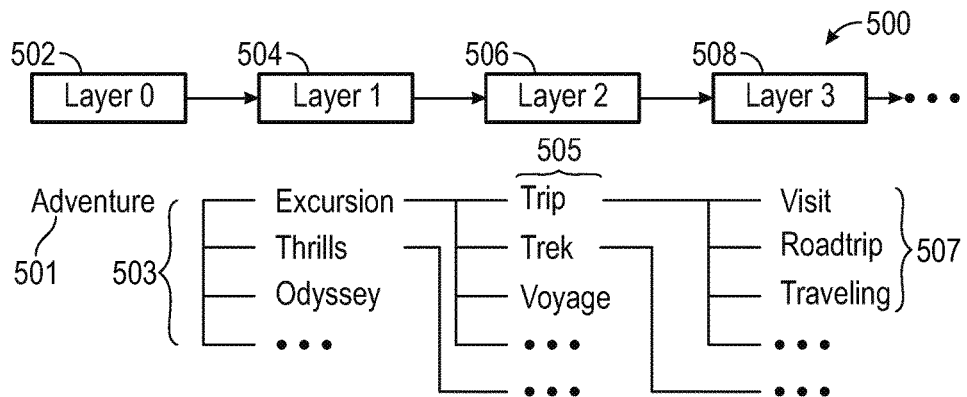

Next, in step 403, each shot transition from the video file 224 is submitted to the convolutional neural network 234 configured to analyze image pixel data for each of the shot transitions to identify entities within the shot transitions. FIG. 5C, which illustrates a words-to-moods service input, represents a list 515 of tuples of identified entities and their respective appearance counts from the provided shot transitions of the video file 224.

Figure 5D:
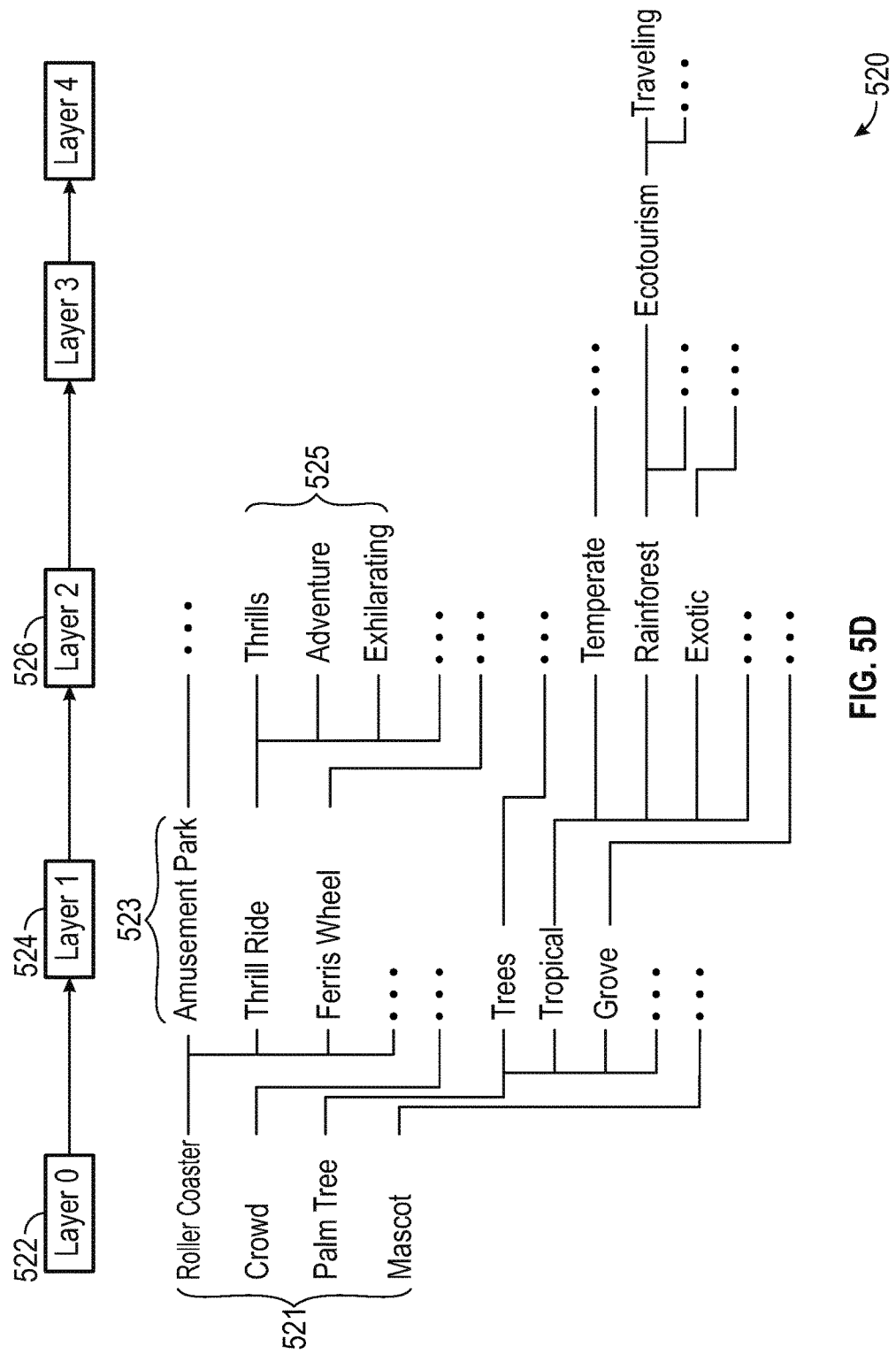

In step 404, the identification of the identified entities of the shot transitions of the video file 224 is provided to the natural language model 240 to generate, for each mood, a second distance set including a distance between each of the identified entities and each word from the large text corpus or the lyrics dataset associated with the respective mood. This step includes various aspects, such as the identification of a distance between words representing the identified entities from the shot transitions of the video file 224 and other words from the trained natural language model 240. For example, with reference to example illustration 520 of FIG. 5D, which illustrates a recursive semantic fields from words input, the entities "Roller Coaster", "Crowd", "Palm Tree", and "Mascot" 521 were identified from the shot transitions of the video file 224 and are placed in Layer 0 522. The words "Amusement Park", "Thrill Ride", and "Ferris Wheel" 523 from Layer 1 524 are one layer away from the particular entity "Roller Coaster" identified at Layer 0 522. The words "Thrills", "Adventure", and "Exhilarating" are in Layer 2 526 and one layer away from the word "Thrill Ride" of Layer 1 524. This layering continues for each of the identified entities from the shot transitions of the video file 224 for the entire set of words used for training the natural language model 240. A table 531 of the words from FIG. 5D and respective layers in which they appear is provided in the example illustration 530 of FIG. 5E, which illustrates a partial table representation for FIG. 5D.

Finally, in step 405, a relevance score is determined for each of moods for the video file 224 based on distance values for each identified entity or word that appears in both the first distance set and the second distance set for the respective mood. FIG. 5F, which illustrates a table representation comparison and scoring, provides an example illustration 540 of determining a relevance score for the mood "Adventure". Each word that appears in common within a certain maximum number of layers of the layering of FIG. 5D (e.g., five layers 542) and FIG. 5A (e.g., ten layers 541) is identified as provided in the table 545. These common words in this example include "Adventure", "Thrills", and "Traveling" 543. A score is then calculated for each common word. For example, for the word "Adventure", the score 544 is calculated as 13, which is equal to the sum of the maximum layer value 541 of 10 for the mood (e.g., FIG. 5A) minus the layer number 0 in which the word appears in the layering for the mood (e.g., FIG. 5A), and the maximum layer value 542 of 5 for the input (e.g., FIG. 5D) minus the layer number 2 in which the word appears in the layering for the input (e.g., FIG. 5D). The scores for each common word are summed together to equal 13, which represents the relevance score for the mood "Adventure" for the video file 224.

Figure 6:
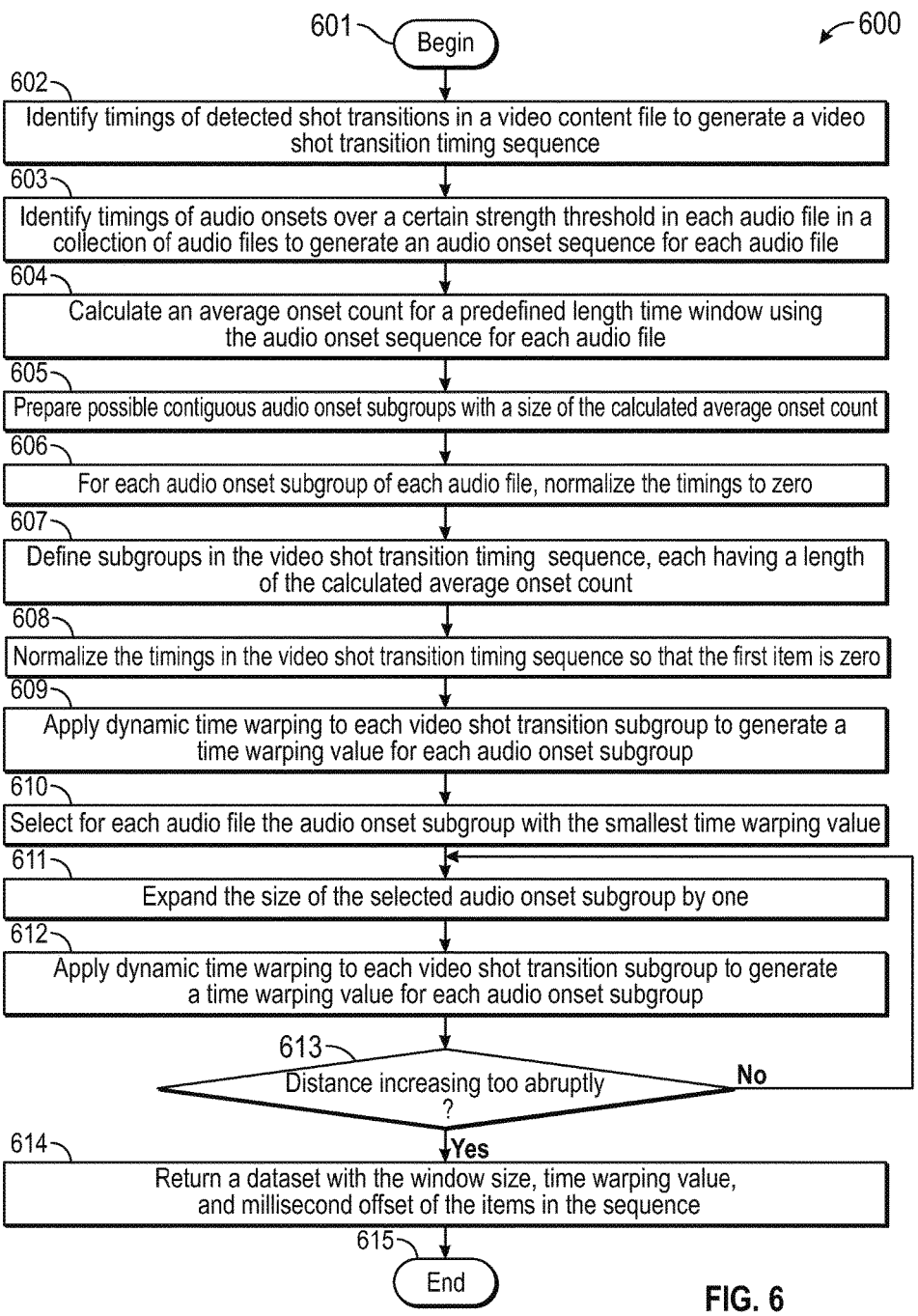
FIG. 6 illustrates an example process for processing audio files to suggest for playback with a video file based on audio onsets of the audio files.

FIG. 6 illustrates an example process 600 for processing audio files to suggest for playback with a video file based on audio onsets of the audio files using the example server 130 of FIG. 2. The example process 600 of FIG. 6 closely relates to steps 306 and 307 of the process 300 of FIG. 3. While FIG. 6 is described with reference to FIG. 2 and FIG. 3, it should be noted that the process steps of FIG. 6 may be performed by other systems and with other methods.

Figure 7G:
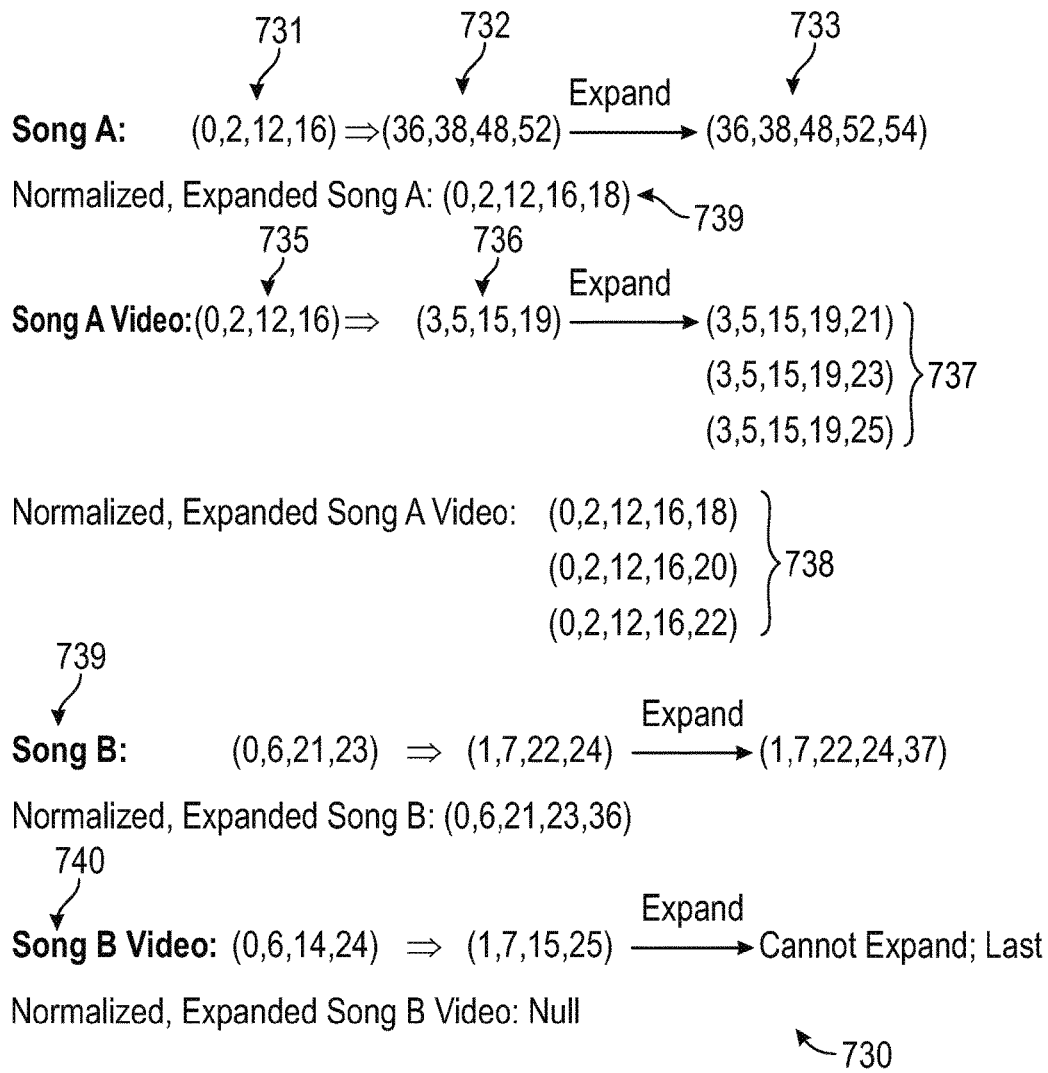

The process 600 proceeds from beginning step 601 to step 602 in which timings of detected shot transitions in a video file are identified in order to generate a video shot transition timing sequence, and subsequently to step 603 in which timings of audio onsets over a certain strength threshold in each audio file in the collection of audio files 244 are identified to generate an audio onset sequence for each audio file. FIG. 7A, which illustrates simplified input time sequences, provides an example identification of video shot transition timings 701 for the video file 224, and audio onset timings 702 and 703 for two audio files from the collection of audio files 244. The numbers identify numerical units (e.g., not necessarily seconds) at which the events occur relative to the video file 224 or audio files.

Next, in step 604, an average onset count for a predefined length time window (e.g., five seconds) is calculated using the audio onset sequence for each audio file, and in step 605 possible contiguous audio onset subgroups with a size of the calculated average onset count are prepared. FIG. 7B, which illustrates prepared contiguous audio onset subgroups, identifies the audio onset timings within each predefined length time window 704 and 705 of the two audio files Song A and Song B of FIG. 7A.

In step 606, the timings for the audio onset subgroups of the audio files are normalized to zero as illustrated in FIG. 7C, which provides normalized audio onset subgroups. In step 607, subgroups in the video shot transition timing sequence are defined, each having a length of the calculated average onset count. FIG. 7D, which illustrates partial video shot transition subgroups, provides an example illustration of video shot transition timing sequences for the video file 224. Subsequently, in step 608, the timings of the video shot transition timing sequence are normalized so that the first item is zero, as provided in the example illustration of FIG. 7E, which provides normalized partial video shot transition subgroups.

Next, in step 609, dynamic time warping is applied to each video shot transition subgroup to generate a time warping value for each audio onset subgroup. In certain aspects, dynamic time warping is used to measure similarity and/or distance between two time domain sequences. The lower a distance, the more "aligned" the sequences are considered to be. For the disclosed method, and particularly for each attempt to recommend an audio file for a video file, dynamic time warping is used for both the timings of the detected shot transitions in the video file 224, and the timings of the detected audio onsets over the predefined length time window. In certain aspects, dynamic time warping accommodates for these two sequences being of different length. In certain aspects, applying unmodified dynamic time warping can impact the precision of the results where the entire length of an audio file is analyzed to recommend a single audio file to be played back with the video file 224. In certain aspects of the disclosed system, multiple portions of different audio files can be recommended for playback with the video file 224 based on the disclosed methods.

In step 610, the audio onset subgroup with the smallest time warping value is selected for each audio file. With reference to the example time warping values tables 712 and 714 of the illustration 710 of FIG. 7F, which illustrates dynamic time warnings applied to a partial subgroup matrix for Songs A and B, respectively, the audio onset subgroup for (0, 2, 12, 16) 715 having a zero time warping value 717 for the video shot transition subgroup (0, 2, 12, 16) 716 is selected as the distance 723 for Song A. As illustrated in FIG. 7F, the offset for the selected audio onset subgroup 715 is thirty six 721 (with reference to the audio onset subgroups 706 and 707 of FIGS. 7B and 7C, respectively). The audio onset subgroup for (0, 6, 21, 23) 718 having a value of one time warping value 720 for the video shot transition subgroup (0, 6, 14, 24) 719 is selected as the distance 724 for Song B. As illustrated in FIG. 7F, the offset for the selected audio onset subgroup 718 is one 722 (with reference to the audio onset subgroups 708 and 709 of FIGS. 7B and 7C, respectively). The pairing of distance and offset values for each song are identified as pairings 725 and 726 for Songs A and B, respectively.

Next, in step 611, the size of the selected audio onset subgroup(s) is expanded by one to include an additional audio onset timing that occurs in the audio file after the timed onsets already identified for the subgroup. For example, with reference to the example illustration 730 of FIG. 7G, which provides expanded best subgroups and new video shot transition subgroups, the selected normalized audio onset subgroup 731 (715 in FIG. 7F) for the first audio file Song A is denormalized 732 and then expanded to produce an expanded audio onset subgroup 733. The expanded audio onset subgroup is then normalized 734. Similarly, for the related portion of the video file 224 represented by the selected video shot transition subgroup 735 (716 in FIG. 7F), the selected video shot transition subgroup 735 is denormalized 736 and then expanded to include subsequent (in timing) video shot transition timing identifiers to produce a range of expanded video shot transition subgroups 737. The expanded audio onset subgroups are then normalized 738. A similar denormalization, expansion, and normalization occurs with the second audio file, Song B 739, and the related portion of the video file 224 represented by the selected video shot transition subgroup 740 (719 in FIG. 7F). When attempting to expand the selected video shot transition subgroup 740, however, no additional shot transitions can be identified after the last shot transition timing identifier in the selected video shot transition subgroup 740 (1, 7, 15, and 25).

In step 612, dynamic time warping is again applied to each video shot transition subgroup to generate a time warping value for each audio onset subgroup (similar to step 609). With reference to the example time warping values table 752 of the illustration 750 of FIG. 7H, which provides dynamic time warping applied to expanded subgroups for Songs A and B, the expanded audio onset subgroup for (0, 2, 12, 16, 18) 753 has a zero time warping value 755 for the expanded video shot transition subgroup (0, 2, 12, 16, 18) 754. The second audio file, Song B 756, has no associated warping value because an expansion was not possible as described above with reference to FIG. 7G.

Figures 7H, 7I, 7J:
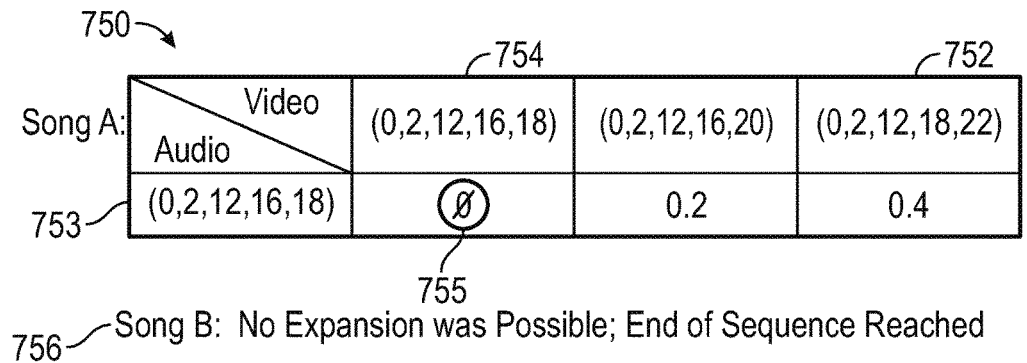

In decision step 613, a decision is made whether the distance values for the audio files are increasing too abruptly. If the decision is "no", the process 600 returns to step 611, otherwise if the decision is "yes" the process 600 proceeds to step 614. The determination in FIGS. 7G and 7H that expansion was not possible for the second audio file, Song B 756, is indicative that the distance values are increasing too abruptly, so the process 600 proceeds to step 614 in which a dataset is returned with the window size, time warping value, and millisecond offset of the items in the sequence. With reference to FIG. 7I, the dataset includes matches for Song A and Song B, namely the tuple of the sequence count (e.g., indicative for Song A of the expanded audio onset and video shot transition subgroups, but the initial audio onset and video shot transition subgroups for Song B), lowest warping value, and associated offset value (which is indicative of the timing in the audio file at which to begin playing the audio file relative to the portion of the video file 224 selected to be played. Based on the examples provided in FIG. 7I, Song A would be selected for playback with the video file 224 because, for example, it has a longer matched sequence at time indicator 4, but also has a lower dynamic time warping value of 0.0 compared to Song B. Thus, audio files may be selected for playback with video files by identifying audio files with a maximized length of matched sequence and minimized dynamic time warping values.

The returned datasets of step 614 can be aggregated and sorted by ascending distance, as provided in the example table 760 of FIG. 7J. The table 760 includes datasets indicative of two different strategies for generating datasets that can be used for testing alignments: a "fast" strategy and a "precise" strategy. The fast strategy limits consideration to adjacent sequence items for the subgroup. The fast strategy yields a relatively small amount of subgroups (or "tuples") (often resulting in fewer calculations, and faster wall-to-wall execution, but potentially less precision in the results). The precise strategy accumulates random combinations up to a certain threshold (or all of them). The precise strategy will yield a large amount of subgroups, which can result in more calculations and slower execution, but likely more precise results. The table includes various subgroups including, for example, an invalid subgroup with three timings instead of four as the timing 25 is the last possible timing for the video file 224

Hardware Overview

Figure 8:
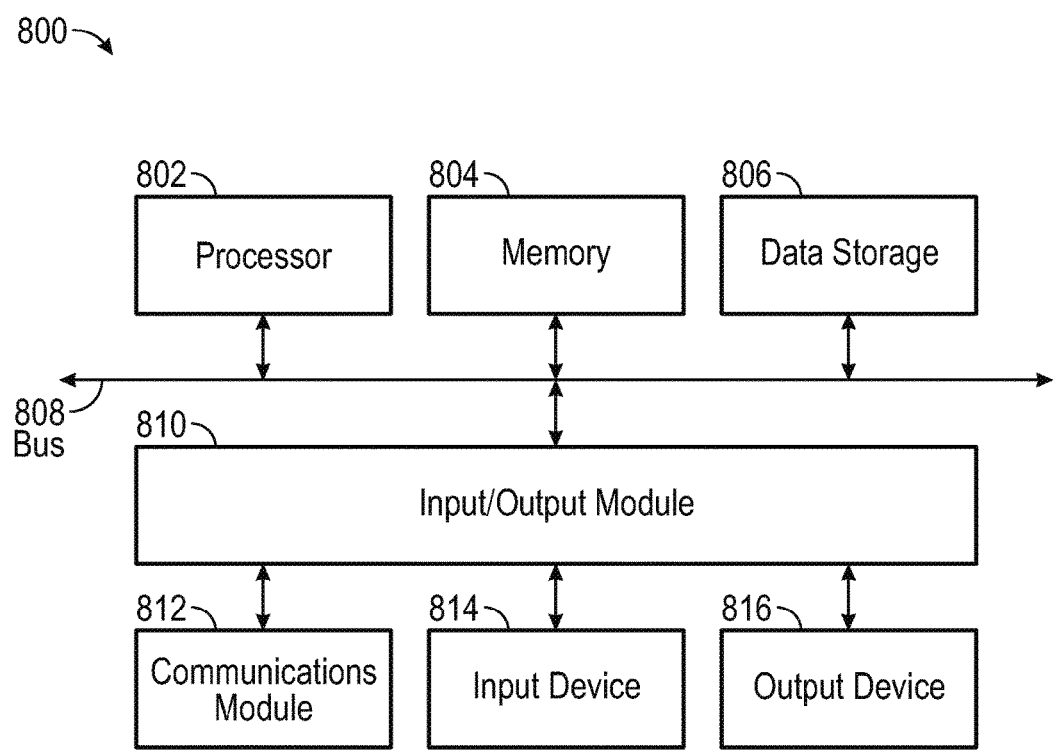
FIG. 8 is a block diagram illustrating an example computer system with which the clients and server of FIG. 2 can be implemented.

FIG. 8 is a block diagram illustrating an example computer system 800 with which the client 110 and server 130 of FIG. 2 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processor 212 and 236) coupled with bus 808 for processing information. According to one aspect, the computer system 800 can be a cloud computing server of an IaaS that is able to support PaaS and SaaS services. According to one aspect, the computer system 800 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 800 may be implemented with one or more processors 802. Processor 802 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry. Expansion memory may also be provided and connected to computer system 800 through input/output module 810, which may include, for example, a SIMM (Single In Line Memory Module) card interface. Such expansion memory may provide extra storage space for computer system 800, or may also store applications or other information for computer system 800. Specifically, expansion memory may include instructions to carry out or supplement the processes described above, and may include secure information also. Thus, for example, expansion memory may be provided as a security module for computer system 800, and may be programmed with instructions that permit secure use of computer system 800. In addition, secure applications may be provided via the SIMM cards, along with additional information, such as placing identifying information on the SIMM card in a non-hackable manner.

The instructions may be stored in the memory 804 and implemented in one or more computer program products, e.g., one or more modules of computer program instructions encoded on a computer readable medium for execution by, or to control the operation of, the computer system 800 and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Example input/output modules 810 include data ports such as USB ports. In addition, input/output module 810 may be provided in communication with processor 802, so as to enable near area communication of computer system 800 with other devices. The input/output module 810 may provide, for example, for wired communication in some implementations, or for wireless communication in other implementations, and multiple interfaces may also be used. The input/output module 810 is configured to connect to a communications module 812. Example communications modules 812 (e.g., communications module 218 and 238) include networking interface cards, such as Ethernet cards and modems.

The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 812 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 812 sends and receives electrical, electromagnetic or optical signals that carry digital data streams representing various types of information. The network link typically provides data communication through one or more networks to other data devices. For example, the network link of the communications module 812 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 812, which carry the digital data to and from computer system 800, are example forms of transmission media.

Computer system 800 can send messages and receive data, including program code, through the network(s), the network link and communications module 812. In the Internet example, a server might transmit a requested code for an application program through Internet, the ISP, the local network and communications module 812. The received code may be executed by processor 802 as it is received, and/or stored in data storage 806 for later execution.

In certain aspects, the input/output module 810 is configured to connect to a plurality of devices, such as an input device 814 (e.g., input device 216) and/or an output device 816 (e.g., output device 214). Example input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 816 may comprise appropriate circuitry for driving the output device 816 to present graphical and other information to a user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. Processor 802 may process the executable instructions and/or data structures by remotely accessing the computer program product, for example by downloading the executable instructions and/or data structures from a remote server through communications module 812 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 802 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 808. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method implemented through a computer memory and a processor executing instructions which when executed cause the processor to perform:
   receiving a selection of a video file;
   identifying shot transition timings in the video file;
   analyzing each shot transition associated with the identified shot transition timings to identify an entity within the respective shot transition;
   providing an identification of the identified entities to a natural language model to identify at least one mood associated with the identified entities;
   selecting, from a collection of audio files, at least one audio file associated with the at least one mood and comprising an average audio onset distance within an audio onset distance threshold; and
   providing an identification of the at least one audio file as a suggestion for audio playback with the video file.

2. The computer-implemented method of claim 1, wherein analyzing each shot transition to identify an entity within the respective shot transition comprises submitting each shot transition to a computer-operated convolutional neural network that is configured to analyze image pixel data for each of the shot transitions to identify entities within the shot transitions.

3. The computer-implemented method of claim 1, wherein analyzing each shot transition to identify an entity within the respective shot transition comprises at least one of providing greater weight to entities identified in multiple shot transitions, or discarding a shot transition comprising no identifiable entity.

4. The computer-implemented method of claim 1, wherein the natural language model comprises at least one of a Word Embedding model, GloVe model, or Word2Vec model.

5. The computer-implemented method of claim 1, wherein the natural language model is trained using at least one of a large text corpus or a lyrics dataset.

6. The computer-implemented method of claim 5, wherein subsequent to training the natural language model, a recurring semantic field is generated for a plurality of moods comprising the at least one mood.

7. The computer-implemented method of claim 5, wherein generating the recurring semantic field for the plurality of moods comprises identifying, for each of a plurality of moods comprising the at least one mood, a distance for words from the large text corpus or the lyrics dataset associated with the respective mood.

8. The computer-implemented method of claim 1, wherein providing the identification of the identified entities to the natural language model to identify at least one mood associated with the identified entities comprises determining a distance of each of the identified entities from each of a plurality of moods comprising the at least one mood to determine a relevance score for each of the plurality of moods for the video file, and selecting as the at least one mood one of the plurality of moods having the highest relevance score.

9. The computer-implemented method of claim 1, wherein the selecting the at least one audio file associated with the at least one mood and comprising the average audio onset distance within the audio onset distance threshold comprises:
   determining the timings of the shot transitions in the video file;
   identifying the timings of the detected audio onsets in each audio file from the collection of audio files; and
   applying a time series alignment algorithm to at least a portion of each audio file from the collection of audio files and at least a portion of the video file to determine the average audio onset distance for the at least a portion of each audio file with respect to the at least a portion of the video file.

10. The computer-implemented method of claim 1, wherein the collection of audio files comprises audio files associated with a plurality of moods comprising the at least one mood prior to receiving the selection of the video file.

11. A system comprising:
   a memory comprising a collection of audio files associated with a plurality of moods; and
   a processor configured to execute instructions which, when executed, cause the processor to:
   receive a selection of a video file;
   identify shot transition timings in the video file;
   analyze each shot transition associated with the identified shot transition timings to a identify an entity within the respective shot transition;
   provide an identification of the identified entities to a natural language model to identify at least one mood, from the plurality of moods, associated with the identified entities;

select, from a collection of audio files, at least one audio file associated with the at least one mood and comprising an average audio onset distance within an audio onset distance threshold; and provide an identification of the at least one audio file as a suggestion for audio playback with the video file.

12. The system of claim 11, wherein analyzing each shot transition to identify an entity within the respective shot transition comprises submitting each shot transition to a computer-operated convolutional neural network that is configured to analyze image pixel data for each of the shot transitions to identify entities within the shot transitions.

13. The system of claim 11, wherein analyzing each shot transition to a identify an entity within the respective shot transition comprises at least one of providing greater weight to entities identified in multiple shot transitions, or discarding a shot transition comprising no identifiable entity.

14. The system of claim 11, wherein the natural language model comprises at least one of a Word Embedding model, GloVe model, or Word2Vec model.

15. The system of claim 11, wherein the natural language model is trained using at least one of a large text corpus or a lyrics dataset.

16. The system of claim 15, wherein subsequent to training the natural language model, a recurring semantic field is generated for a plurality of moods comprising the at least one mood.

17. The system of claim 15, wherein generating the recurring semantic field for a plurality of moods comprising the at least one mood comprises identifying, for each of the plurality of moods, a distance for words from the large text corpus or the lyrics dataset associated with the respective mood.

18. The system of claim 11, wherein providing the identification of the identified entities to the natural language model to identify at least one mood associated with the identified entities comprises determining a distance of each of the identified entities from each of a plurality of moods comprising the at least one mood to determine a relevance score for each of the plurality of moods for the video file, and selecting as the at least one mood one of the plurality of moods having the highest relevance score.

19. The system of claim 11, wherein the selecting the at least one audio file associated with the at least one mood and comprising the average audio onset distance within the audio onset distance threshold comprises:

determining the timings of the shot transitions in the video file;

identifying the timings of the detected audio onsets in each audio file from the collection of audio files; and applying a time series alignment algorithm to at least a portion of each audio file from the collection of audio files and at least a portion of the video file to determine the average audio onset distance for the at least a portion of each audio file with respect to the at least a portion of the video file.

20. A computer-implemented method implemented through a computer memory and a processor executing instructions which when executed cause the processor to perform:

providing a selection of a video file;

receiving an identification of at least one mood identified by a natural language model processing names of entities identified from each shot transition in the video file;

receiving an identification of at least one audio file, from a collection of audio files, associated with the at least one mood and comprising an average audio onset distance within an audio onset distance threshold; and selecting the at least one audio file for audio playback with the video file.

\* \* \* \* \*